United States Patent [19]

Cole et al.

[11] Patent Number: 6,071,847
[45] Date of Patent: Jun. 6, 2000

[54] GAS PHASE ANIONIC POLYMERIZATION OF DIENE ELASTOMERS

[75] Inventors: William M. Cole, Clinton; William L. Hergenrother, Akron, both of Ohio; Theodore J. Knutson, Edina, Minn.; Georg G. A. Böhm, Akron, Ohio

[73] Assignee: Bridgestone Corporation, Tokyo, Japan

[21] Appl. No.: 09/041,719

[22] Filed: Mar. 13, 1998

[51] Int. Cl.[7] .................. C08F 8/00; C08F 4/44; C08F 4/46; B01J 31/00
[52] U.S. Cl. .................. 502/152; 526/173; 525/332.8
[58] Field of Search .................. 525/332.8; 502/151; 526/97, 173

[56] References Cited

U.S. PATENT DOCUMENTS

| | | |
|---|---|---|
| 4,129,701 | 12/1978 | Jezl et al. . |
| 4,429,091 | 1/1984 | Hall . |
| 4,476,240 | 10/1984 | Hall et al. . |
| 4,520,123 | 5/1985 | Hall . |
| 4,861,742 | 8/1989 | Bronstert et al. . |
| 5,208,303 | 5/1993 | Bailly . |
| 5,238,893 | 8/1993 | Hergenrother et al. . |
| 5,252,688 | 10/1993 | Bailly et al. . |
| 5,264,506 | 11/1993 | Eisinger et al. . |
| 5,268,413 | 12/1993 | Antkowiak et al. . |
| 5,268,439 | 12/1993 | Hergenrother et al. . |
| 5,317,036 | 5/1994 | Brady, III et al. . |
| 5,329,005 | 7/1994 | Lawson et al. . |
| 5,332,810 | 7/1994 | Lawson et al. . |
| 5,354,822 | 10/1994 | Antkowiak et al. . |
| 5,652,304 | 7/1997 | Calderon et al. . |
| 5,665,826 | 9/1997 | Halasa et al. . |

FOREIGN PATENT DOCUMENTS

| | | |
|---|---|---|
| 2133526 | 3/1994 | Canada . |
| 0 475 603 A1 | 3/1992 | European Pat. Off. . |
| 1451280 | 9/1976 | United Kingdom . |
| WO 96/04321 | 2/1996 | WIPO . |
| WO 97/08211 | 3/1997 | WIPO . |

*Primary Examiner*—David W. Wu
*Assistant Examiner*—Tanya Zalukaeva
*Attorney, Agent, or Firm*—John H. Hornickel; Frank J. Troy, St.; Barbara E. Arndt

[57] ABSTRACT

The invention provides solid supported anionic catalysts, suitable for gas phase anionic polymerization of conjugated diene monomers, that are useful for anionically producing very high molecular weight branched diene polymers, such as styrene butadiene rubber, polybutadiene rubber, polyisoprene rubber, and the like. The catalysts comprise a metalatable particle, such as a bound rubber, a thermoplastic polymer or a cured elastomer, that is multiply metalated with Group IA alkali metal atoms. The multi-branched diene polymers obtained by gas phase anionic polymerization employing the catalysts exhibit desirable properties, such as an extremely high molecular weight, a controlled molecular weight distribution, $T_g$ and vinyl content, and the ability to readily absorb hydrocarbon solvents and oils. The polymers are easily compounded to form vulcanizable elastomeric compounds and articles, such as tires, that have excellent resistance to wear and tear and exhibit reduced hysteresis properties.

16 Claims, 4 Drawing Sheets

GAS PHASE ANIONIC POLYMERIZATION OF DIENE ELASTOMERS

BACKGROUND OF THE INVENTION

The invention relates to the field of gas phase polymerization reactions. In particular, the invention is directed to novel solid supported gas phase anionic polymerization catalysts for the production of diene elastomers, especially styrene butadiene rubber (SBR).

Gas phase fluidized bed, stirred or paddle-type reactor processes for the production of polymers, such as poly-α-olefins and polybutadiene having highly desirable and improved properties, are well known. These gas phase processes, especially the gas fluidized bed process, provide a means for producing polymers with a drastic reduction in capital investment expense and a dramatic savings in energy usage and operating costs, as well as a greater margin of safety and fewer environmental concerns, compared to other conventional polymerization processes. The polymer products of gas phase polymerization processes are free-flowing granular powders that are readily compounded to form rubber products.

As in solution polymerization processes, a catalyst is usually required for polymerization of monomers in gas phase polymerization. However, the catalysts employed in gas phase polymerization of α-olefins such as ethylene or propylene, or conjugated dienes such as butadiene, have hitherto been limited to solid supported Ziegler-Natta type catalysts based on titanium, vanadium and the like, solid supported chromium salts, Group VIII transition metal compounds, or other solid supported or solution transition metal coordination catalysts, and the like. Catalysts that exhibit activity in solution phase anionic polymerization reactions and those which operate by ionic or free radical mechanisms are typically not suitable for gas phase polymerization processes. Thus, none of the catalysts conventionally used in gas phase polymerization is capable of anionically copolymerizing conjugated dienes to form diene rubbers, which are the key raw materials used in the production of rubber tires.

Moreover, one of the disadvantages associated with supported gas phase catalysts is that the support material such as alumina, silica, and the like, remains behind in the polymer product as inorganic residual ash thereby increasing the overall impurity level of the polymer. Depending on the amount of such impurity, some of the properties of the polymers may possibly be affected, such as film appearance rating, impact resistance, tear strength, and the like. Another disadvantage of known gas phase polymerization processes using these catalysts is that they typically require undesirably large quantities (e.g., 30% in the product) of powdering filler materials, such as carbon black, in order to reduce the "stickiness" of the resulting polymer and prevent the agglomeration of the resin particles and the formation of large polymer chunks.

Because of the advantages of gas phase polymerization compared with solution polymerization, however, it would be useful to provide a gas phase anionic polymerization process by which diene elastomers, such as styrene butadiene rubber, polybutadiene rubber, polyisoprene rubber, and the like, can be economically and efficiently produced.

SUMMARY OF THE INVENTION

The invention provides solid supported anionic catalysts, suitable for gas phase anionic polymerization of conjugated diene monomers, that are useful for anionically producing very high molecular weight branched diene polymers, such as styrene butadiene rubber, polybutadiene rubber, polyisoprene rubber, and the like. Because of their extremely high molecular weight and controlled molecular weight distribution, glass transition temperature ($T_g$) and vinyl content, the macro-branched polymers produced by a gas phase anionic polymerization process employing the invention catalysts are useful for producing many different high performance vulcanates. The polymers synthesized by the process of the invention also exhibit other desirable properties, such as the ability to readily absorb hydrocarbon solvents and oils, and they are easily compounded to form vulcanizable elastomeric compounds and articles that have excellent resistance to wear and tear and exhibit reduced hysteresis properties.

In one embodiment of the invention, the catalyst has the formula $P(Me)_n$, where P is a metalatable particle having a diameter of about 1 micron to about 1000 microns comprising a bound rubber. The particle is multiply-metalated with "n" covalently bonded Group IA alkali metal (Me) atoms. As used in the context of the invention and as known to one skilled in the art, the term "bound rubber" means rubber to which carbon black is attached by more than just physical entrainment and forms a simple carbon network with the rubber. The bound rubber particle may comprise any metalatable carbon black-bound rubber, such as carbon black-styrene butadiene rubber, carbon black-butadiene rubber, carbon black-natural rubber, and the like. As used in the context of the invention, the term "metalated" refers to an acid:base reaction, known to those skilled in the art, involving the transfer of a metal atom from a strong base to a more acidic polymer with the concomitant transfer of a hydrogen atom from the polymer to the base, thus forming a polymer carbon-metal atom covalent bond. A "metalatable" bound rubber (or a metalatable thermoplastic polymer or a metalatable cured elastomer employed in embodiments of the invention) is one that can participate in this reaction and become metalated.

The number of metal atoms bound to the bound rubber particle ranges from n=3 to n=a multiplicity of atoms, $10^x$ (e.g., $10^{10}$). The alkali metal atoms bonded to a single particle may all be the same or may be different from each other. The metal atoms may be any Group IA metal including lithium, sodium, potassium, rubidium, cesium and francium. Preferably the metal atoms are selected from lithium, sodium and potassium and, more preferably, are a mixture of lithium atoms and at least one of sodium atoms and potassium atoms. Most preferably, all of the alkali metal atoms are the same and are lithium atoms.

Other solid supported anionic catalysts that are suitable for use in gas phase polymerization of conjugated diene monomers, as described herein, are disclosed in our copending, co-assigned U.S. patent application Ser. No. 09/042,096, filed on the same day as this application (Attorney Docket No. 9704026), entitled "Anionic Polymerization Initiators For Preparing Macro-Branched Diene Rubbers", the disclosure of which relating to the initiators and methods for their preparation is hereby incorporated by reference. The disclosed initiators, which are also useful for solution phase anionic polymerization of conjugated diene monomers, have the same formula as the catalysts of the present invention but differ from the invention catalysts in that the particle portion of the disclosed initiators comprises a metalatable thermoplastic polymer (preferably having a $T_g$ of 80° C. to about 300° C.) or a cured elastomer, rather than a bound rubber.

Each of the above previously disclosed anionic polymerization initiators and the invention anionic polymerization catalyst, when charged into the reaction zone of a gas phase polymerization apparatus, is capable of anionically homopolymerizing conjugated diolefin monomers having about 4 to about 12 carbon atoms and copolymerizing conjugated diolefin monomers and monovinyl aromatic monomers having from about 8 to about 20 carbon atoms to form very high molecular weight branched diene polymers.

The macro-branched diene polymers produced by the process of the invention are light, granular, and resemble a fish "caviar". In contrast to polymers produced by previous gas phase polymerization processes, the polymers produced by the above previously disclosed initiators and the invention catalyst are not sticky and do not produce agglomerates. Thus, the addition of diluting powdering agents is not required, resulting in a purer polymer product. Moreover, because the particles remaining behind in the polymer are polymeric, they do not add inorganic impurities to the resulting rubber product, and they are sheared (or dispersed) during compounding or milling, and processed like normal rubber.

The present invention provides the macro-branched diene polymers containing particles derived from the catalysts, a vulcanizable elastomer composition formed from the polymer, and a tire having at least one component formed from the vulcanizable elastomer composition. The invention further provides a method for preparing the solid supported anionic polymerization catalysts, and a method for gas phase anionic polymerization employing the invention catalysts and the initiators disclosed in the copending U.S. patent application Ser. No. 09/042,096, incorporated by reference above.

In another embodiment of the invention, an anionic gas phase polymerization method for producing high molecular weight diene polymers is provided in which ground particles such as graphitized carbon black, polyethylene, acetone-extracted scrap rubber, or the like are coated with oil in which free n-butyl lithium has been dissolved. A well known catalyst for anionic polymerization of linear polymers in solution is n-butyl lithium. It has been herein surprisingly discovered that a multiplicity of molecules of n-butyl lithium thus absorbed on the solid support particles also acts as a catalyst for gas phase anionic polymerization and, when charged into the reaction zone of a gas phase polymerization apparatus, is capable of anionically homopolymerizing conjugated diolefin monomers having about 4 to about 12 carbon atoms and copolymerizing conjugated diolefin monomers with monovinyl aromatic monomers having from about 8 to about 20 carbon atoms to form high molecular weight diene polymers.

DETAILED DESCRIPTION OF THE INVENTION

In one embodiment, the invention provides a novel solid supported anionic polymerization catalyst for gas phase anionic polymerization of conjugated diolefin monomers having from about 4 to about 12 carbon atoms, and copolymers of the conjugated diolefin monomers together with monovinyl aromatic monomers having from about 8 to about 20 carbon atoms, as described below, to form a macro-branched diene polymer. The catalyst has the formula

$P(Me)_n$ where P is a metalatable particle having a diameter of about 1 micron to about 1000 microns comprising a bound rubber, Me is a Group IA alkali metal covalently bonded to the particle, and n is an integer equal to or greater than 3. More preferably, n represents a multiplicity of alkali metal atoms (Me), $10^x$ (e.g., $10^{10}$), and the particle comprises a multiplicity of covalently bonded alkali metal atoms.

In another aspect of this embodiment of the invention, the metalatable particle comprises a thermoplastic polymer or a cured elastomer, as disclosed in U.S. patent application Ser. No. 09/042,096, previously incorporated by reference, and discussed further below.

The metal atoms may be any Group IA metal including lithium, sodium, potassium, rubidium, cesium and francium. Although rubidium, cesium and francium are usable in the invention catalyst, their use is less preferred because they are comparatively expensive. Therefore, the metal atoms are preferably lithium, sodium or potassium atoms, and more preferably are a mixture of lithium atoms and sodium atoms and/or potassium atoms. Most preferably, all of the alkali metal atoms are lithium.

The alkali metal atoms on a single particle may all be the same or may be different from each other, depending on the alkali metal compound(s) used for the preparation of the catalyst, as described below. For example, the use of a single alkali metal compound, such as an alkyl lithium, an alkyl sodium, an alkyl potassium or another Group IA alkyl metal compound produces particles metalated with a single type of metal. However, the use of a mixture of an alkyl lithium compound together with an alkyl sodium compound and/or an alkyl potassium compound and/or another Group IA alkyl metal compound as a co-agent for metalation produces particles metalated with lithium, as well as sodium and/or potassium and/or the other metal. Preferably, an alkyl lithium compound alone is used in the preparation of the catalysts, resulting in a particle metalated only with lithium.

Figure 1:
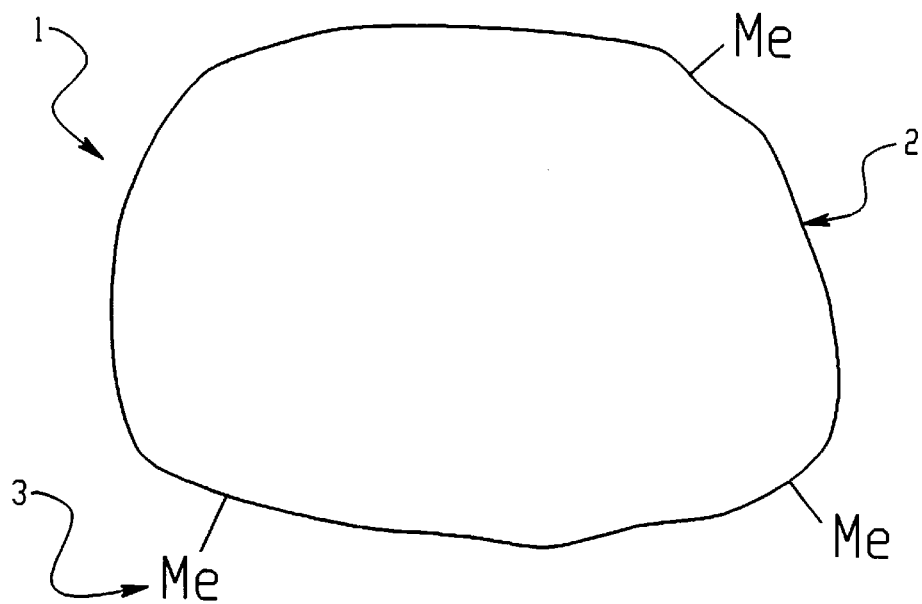
FIG. 1 is a schematic illustration of an invention catalyst comprising a bound rubber particle metalated with three covalently bound alkali metal atoms.
Figure 2:
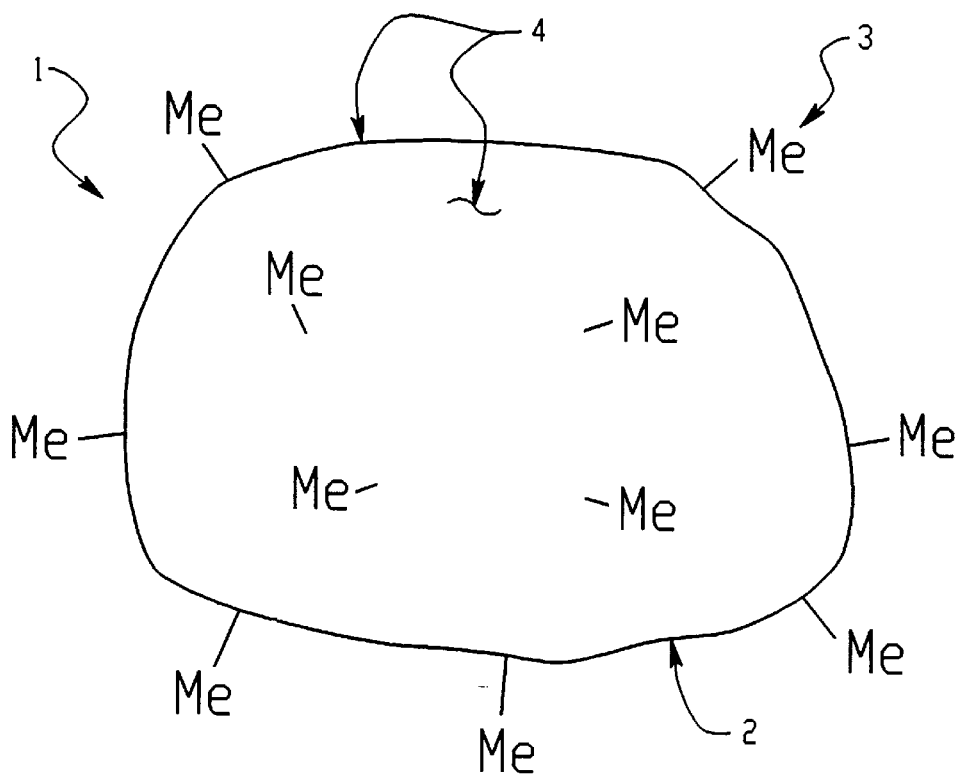
FIG. 2 is a schematic illustration of the catalyst of FIG. 1 metalated with a multiplicity of surface covalently bound alkali metal atoms.
Figure 3:
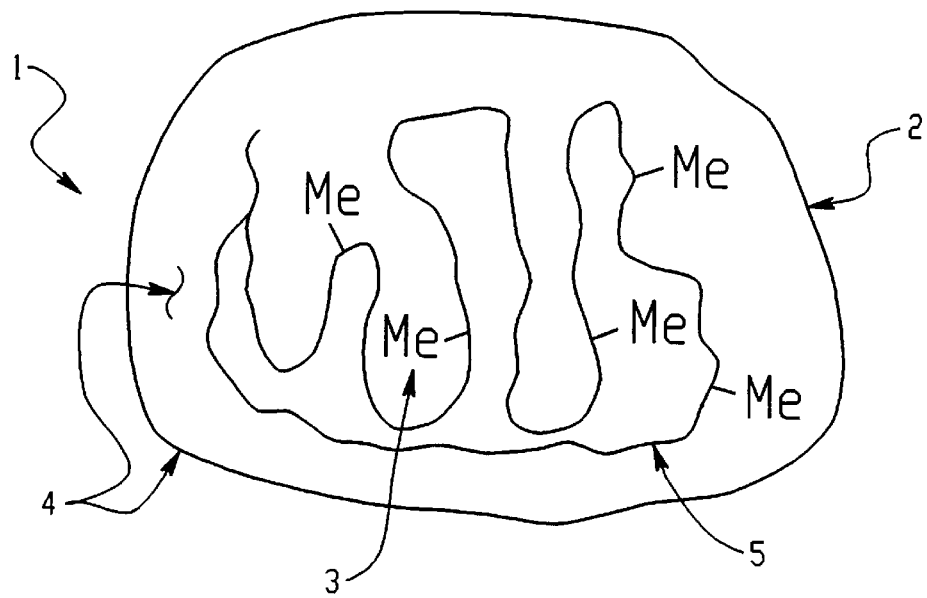
FIG. 3 is a schematic illustration of an invention catalyst comprising a bound rubber particle where the inner matrix of the particle is multiply metalated with covalently bound alkali metal atoms.
Figure 4:
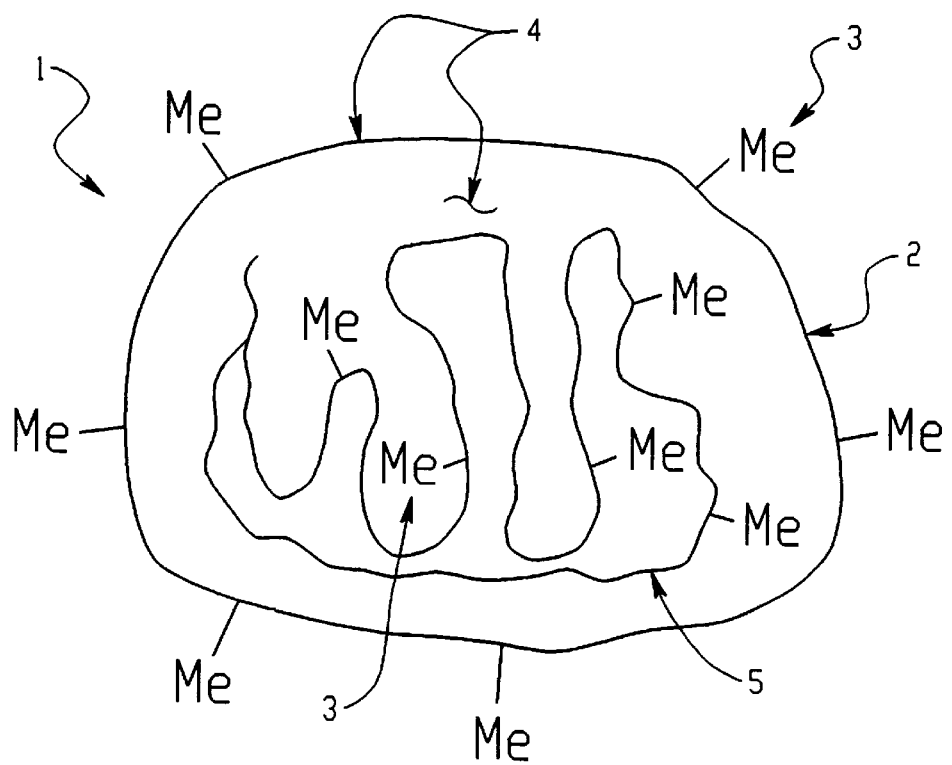
FIG. 4 is a schematic illustration of an invention catalyst comprising the bound rubber particle where both the surface and the inner matrix of the particle are multiply metalated with covalently bound metal atoms.

Schematic illustrations of the first embodiment of the invention catalyst are presented in FIGS. 1–4. As illustrated in FIG. 1, the catalyst 1 comprises a particle 2 which comprises a bound rubber, a thermoplastic polymer, or a cured elastomer, having carbon atoms to which three (n=3) alkali metal atoms (Me) 3 are covalently bonded, each to a different carbon atom. In a preferred embodiment illustrated in FIG. 2, the particle 2 has a multiplicity of alkali metal atoms 3 bonded to a multiplicity of carbon atoms on the particle. The particle 2 comprises an outer surface 4 and an inner matrix 5. Thus, as illustrated in FIGS. 2–4, the alkali metal atoms 3 may be covalently bonded to the outer surface 4 (FIG. 2), or to the inner matrix 5 (FIG. 3), or to both the outer surface 4 and the inner matrix 5 (FIG. 4). During the gas phase polymerization process described below, each of the alkali metal atoms are carried on the "living ends" of growing polymers bonded to the carbon atoms of the particle support.

In one aspect of this embodiment of the invention, the particle comprises a metalatable bound rubber particle. Suitable metalatable bound rubbers for use in the invention include any metalatable carbon black-bound rubber prepared as described below, including, but not limited to, carbon black-styrene butadiene rubber, carbon black-polybutadiene rubber, carbon black-polyisoprene rubber, carbon black-styrene isoprene rubber, carbon black-styrene butadiene isoprene rubber, and carbon black-natural rubber. Other such bound rubbers are well known to those skilled in the art. The bound rubber particle provides a simple carbon network solid support for use in the catalyst. Thus, when employed as the particle portion of the gas phase anionic polymerization catalyst to produce the macro-branched polymers illustrated in FIG. 5, the particle remains as part of the macro-branched polymer complex. When the macro-branched polymers that include the bound rubber particles are compounded or milled, the points of attachment of the polymers to the particles are shear-degraded, thus allowing for better processibility of the polymers.

In another aspect of this embodiment of the invention, the particle comprises a metalatable thermoplastic polymer that preferably has a $T_g$ of 80° C. to about 300° C. Suitable metalatable thermoplastic polymers for use in the invention include, but are not limited to, polyethylene, polypropylene, polystyrenes, substituted polystyrenes, and the like. Other such metalatable thermoplastic polymers are well known to those skilled in the art. When employed as the particle portion of the anionic polymerization catalyst to produce the macro-branched polymers illustrated in FIG. 5, this particle also remains as part of the macro-branched polymer complex. When these macro-branched polymers are compounded, the processing temperatures are preferably higher than the $T_g$ of the thermoplastic polymer particle and allow the breakup of the thermoplastic particle into smaller particles that could, in the limit, contain only one polymer/elastomer chain attached to the particle, thus allowing for better processibility of the polymers.

In yet another aspect of this embodiment of the invention, the particle comprises a metalatable cured elastomer. The cured elastomer may be any metalatable cured elastomer known to those skilled in the art, including compounded cured rubber, such as scrap tire rubber. Exemplary cured elastomers suitable for use in the invention are styrene butadiene rubber, natural rubber, polybutadiene, polyisoprene, and the like. Other such metalatable cured elastomers are well known to those skilled in the art. Because some oils, curing agents and other ingredients in compounded cured rubber may interfere with the metalation of the particle using an alkali metal compound, the compounded cured rubber particle is preferably extracted with acetone for at least 16 hours to substantially remove at least the curing agents, prior to use in preparation of the catalyst. When the macro-branched polymers that include the cured elastomeric particles are compounded or milled, the points of attachment of the polymers to the particles are shear-degraded, thus allowing for better processibility of the polymers.

Figure 6:
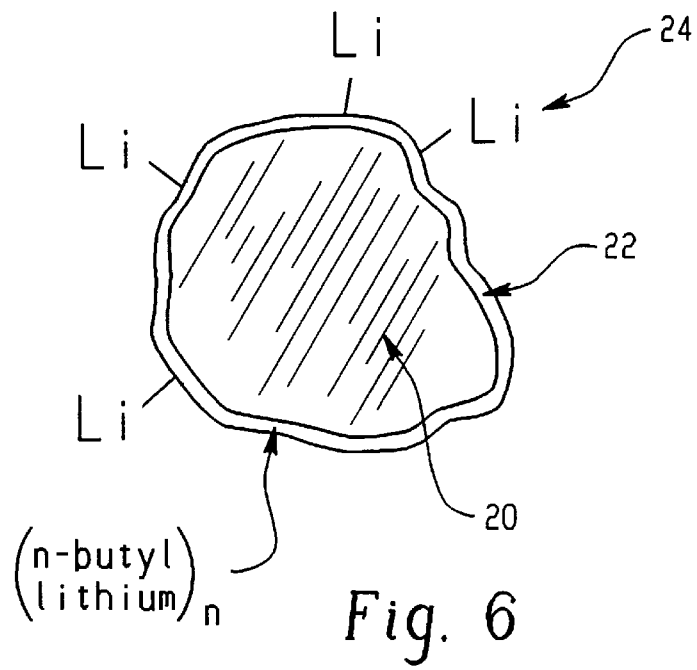
FIG. 6 is a schematic illustration of a particle, such as graphitized carbon black, ground rubber or ground polyethylene, coated with oil in which is dissolved n-butyl lithium.

In another embodiment of the invention, illustrated in FIG. 6, the particle 20 is not metalated with covalently bound metal atoms. Rather, the surface of the particle 20 is coated with an oil 22, preferably a mineral oil, in which is dissolved n-butyl lithium. One advantage of the use of this catalyst is that a multiplicity of molecules of n-butyl lithium are thus absorbed predominantly on the surface of the particle and the lithium atoms 24 are available for gas phase anionic polymerization. In this embodiment illustrated in FIG. 7, the resulting polymer chains 26 are not covalently bonded to the particle, but rather may remain attached to the particle by entanglement or intertwining with other growing polymer chains. The particles preferably comprise a thermoplastic polymer, as described above having a preferable $T_g$ of 80° C. to about 300° C. (e.g., ground polyethylene), a cured elastomer (e.g., acetone-extracted scrap rubber), bound rubber, carbon black, or graphitized carbon black. Graphitized carbon black is known to those skilled in the art as carbon black that has been heated to a very high temperature (e.g., 1000° C.) to remove all chemically reactive sites. The presence of the coated particles in the gas phase polymerization reaction zone is advantageous not only to provide a solid support for the n-butyl lithium catalyst but also to prevent the growing polymers from sticking together and producing agglomerates.

In all embodiments of the invention, the particles, having a diameter of about 1 to about 1000 microns, may be conveniently sized by passing them through a mesh of fixed pore size, as is well known in the art. For example, 20-mesh particles are about 841 microns or less in diameter; 200-mesh particles are about 74 microns or less; and 400-mesh particles are about 37 microns or less. The number of metalation sites on the particles depends on the size of the particles, the concentration of the alkali metal compound employed in the metalation reaction, the process times and temperatures, the polar coordinator employed in the preparation of the particles, and the like.

The bound rubber particles may be prepared in a mixer having variable speed rotors and a temperature control, such as Banbury or Brabender mixer. The rotor speeds and mixer temperatures for preparing bound rubber are known to those skilled in rubber processing. In general, rotor speeds of about 10 rpm to about 200 rpm may be employed to achieve temperatures of about 80° F. to about 400° F. To prepare the bound rubber particles, the polymer is introduced into the mixing chamber and carbon black is gradually added. It is desirable to add an excess of carbon black in order to achieve a high percentage of carbon black-bound rubber, at least 25% of the polymer should be bound with carbon black. Preferably, at least 35% and, more preferably, at least 50% of the polymer should be bound with carbon black. Thus, it is desirable that some free carbon black remains in the mixture in addition to the carbon black bound to the polymer. A weight ratio of polymer to carbon black of about 1:1 generally results in the desired excess amount of carbon black. The polymer and carbon black are then mixed at a selected temperature and rotor speed, for a time sufficient to pulverize the mixture to the desired particle size and to allow the desired amount of the polymer to be bound with carbon black. In general, at a given rotor speed and mixing temperature, the longer the mixing time, the more carbon black is bound, the shorter the mixing time, the less carbon black is bound. For example, at a rotor speed of 60 rpm and a mixing temperature of 140° F., a mixing time of 20 minutes will result in particles having a higher than 50% level of bound rubber. Polymers that have been previously "functionalized", as described below, to facilitate binding of the carbon black, will produce a higher percentage of bound rubber. The particles are then removed from the mixer and sized for use in the preparation of the solid supported anionic catalyst.

To determine the percentage of rubber bound with carbon black, the rubber prepared as above is soaked in toluene for at least 16 hours and preferably about 24 hours. Rubber that has not bound carbon black will dissolve in the toluene. The remaining undissolved rubber has bound carbon black. The weight percentage of bound rubber in the original preparation is mathematically determined.

To prepare the anionic polymerization catalyst comprising the metalated bound rubber particle, the method comprises the steps of providing a bound rubber particle having a diameter of about 1 micron to about 1000 microns, prepared as above; reacting (i) the bound rubber particle with (ii) an alkali metal compound having the formula R(Me), where R represents a hydrocarbyl group containing from one to about 20 carbon atoms, and Me is a Group IA alkali metal, in the presence of (iii) a polar coordinator. The polar coordinator is an activator of the Group IA alkali metal atom and, as known to one skilled in the art, is required for the formation of the carbon atom-metal atom covalent bond during metalation of the particle.

The anionic polymerization catalysts comprising a metalated thermoplastic polymer particle or a cured elastomer particle instead of a bound rubber particle are prepared in exactly the same manner, as described in the copending U.S. patent application Ser. No. 09/042,096, previously incorporated by reference.

In general, the metalated catalysts according to this embodiment of the present invention can be prepared, under anhydrous and anaerobic conditions, by forming a suspension of the bound rubber particles, or the thermoplastic polymer particles, or the cured elastomer particles described above in an anhydrous hydrocarbon solvent, such as cyclohexane, hexane, benzene, toluene, pentane, heptane, and the like, in a dry nitrogen atmosphere. To this suspension is then added a polar coordinator, followed by the addition of an alkali metal compound, described below, in the same or a similar solvent. The molar ratio of the polar coordinator to the alkali metal compound ranges from about 0.03:1 to about 4:1, preferably about 0.05:1 to about 1:1, and more preferably about 0.06:1 to about 0.5:1. The optimum amount of particles present in the reaction mixture varies with the selected ratio of polar coordinator to alkali metal compound, the type of particle employed, the particle diameter, and the degree of metalation desired. One skilled in the art will be able to select the proper amount of particles by examining the exemplary data reported herein in Table 1. The various reaction temperatures and times which may be employed to prepare the catalysts are known to one skilled in the art of anionic polymerization catalyst preparation.

The alkali metal compound employed in the preparation of the metalated solid supported anionic catalyst has the formula R(Me), where Me is a metal of Group IA of the Periodic Table of the Elements, preferably selected from lithium, sodium and potassium and, more preferably, is lithium, and R is a hydrocarbyl group having from one to about 20 carbon atoms. Although lithium alkali metal compounds are most preferred in the method, sodium and/or potassium and/or other Group IA alkali metal compounds including rubidium, cesium and francium, may also be separately employed. Preferably, however, these other compounds are used in a mixture with a lithium compound and the sodium and/or potassium and/or other Group IA compound acts as a co-agent with the lithium compound for metalation. Thus, as described above, the resulting particles may be metalated with one or more types of alkali metal atoms derived from the alkali metal compound(s).

Typical R groups include aliphatic and cyclo-aliphatic groups such as alkyls, cycloalkyls, alkenyls, alkynyls, aryls and aralkyls. Specific examples of R groups include, but are not limited to, methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, combinations of these, and the like. A preferable alkali metal compound for use in preparing the metalated catalysts of the invention is n-butyl lithium.

Each metalated particle thus prepared is a solid supported catalyst that is stable for at least a month or more under pressure in a refrigerated environment and is useful for gas phase anionic polymerization of anionically polymerizable monomers to yield a macro-branched polymeric product. Because of the polymeric nature of the particles, each particle readily absorbs the hydrocarbon solvent and is thus best described as a highly swollen particle. For example, each gram of about 60-mesh to about 35-mesh dry bound rubber particles, or 200-mesh dry scrap rubber particles, is capable of absorbing two to five grams of a solvent in the inner matrices of the particles.

As described above, the swollen particle is metalated with at least three or, preferably, a multiplicity of metal atoms, depending on the selected reaction conditions. Metalation of the particle occurs in the presence of a polar coordinator associated with the polymer carbon-metal bond. Such metalation reactions employing a polar coordinator are known to those skilled in the art. The polar coordinator remains associated with the carbon-metal bond of the catalyst throughout the gas phase anionic polymerization process. However, the presence of the polar coordinator associated with the catalyst results in a modification of diene polymerization that gives a reduced level of 1,4 incorporation of monomers and a concomitant increase in the $T_g$ of the polymer produced (i.e., the higher the concentration of the polar coordinator in the gas phase polymerization reaction zone, the higher is the glass transition temperature ($T_g$) of the resulting diene polymer). The conventional procedure for preparing a standard (non-invention) metalated polymer from an alkali metal compound and a polar coordinator employs a molar ratio of the polar coordinator to the alkali metal of about 2:1. However, if a ratio of 2:1 were employed to multiply metalate the invention catalysts which are subsequently used to polymerize conjugated diene monomers, the polymerization result would be a high $T_g$ graft copolymer product (e.g., a very high vinyl polybutadiene grafted onto a low vinyl 1,4-polybutadiene). It is an object of the present invention to produce polymers having a low $T_g$, preferably less than −20° C., more preferably less than −30° C., and most preferably less than −35° C., for use in rubber products, such as tires. Therefore, it is desirable to prepare the present catalysts in the presence of a lower than standard molar ratio of polar coordinator to alkali metal compound. As disclosed in our copending application Ser. No. 09/042, 096, it has been surprisingly discovered that not only can the ratio of the polar coordinator to the alkali metal compound be reduced to less than 2:1, but the degree of metalation of the particle is actually increased when the molar ratio of the polar coordinator to the alkali metal compound is decreased to values as low as 0.03:1.

Compounds useful as polar coordinators are organic and include, but are not limited to, tetrahydrofuran, linear and cyclic oligomeric oxolanyl alkanes such as 2-2'-di (tetrahydrofuryl)propane, di-piperidyl ethane, dimethyl ether, pentamethyl diethylenediamine, diazabicyclooctane, hexamethylphosphoramide, N-N'-dimethylpiperazine, diethyl ether, tributylamine and the like. The linear and cyclic oligomeric oxolanyl alkane polar coordinators are described in U.S. Pat. No. 4,429,091, the subject matter of which regarding polar solvents is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; fully alkylated diamines such as tetramethylethylene diamine (TMEDA); and fully alkylated triamines.

Figure 5:
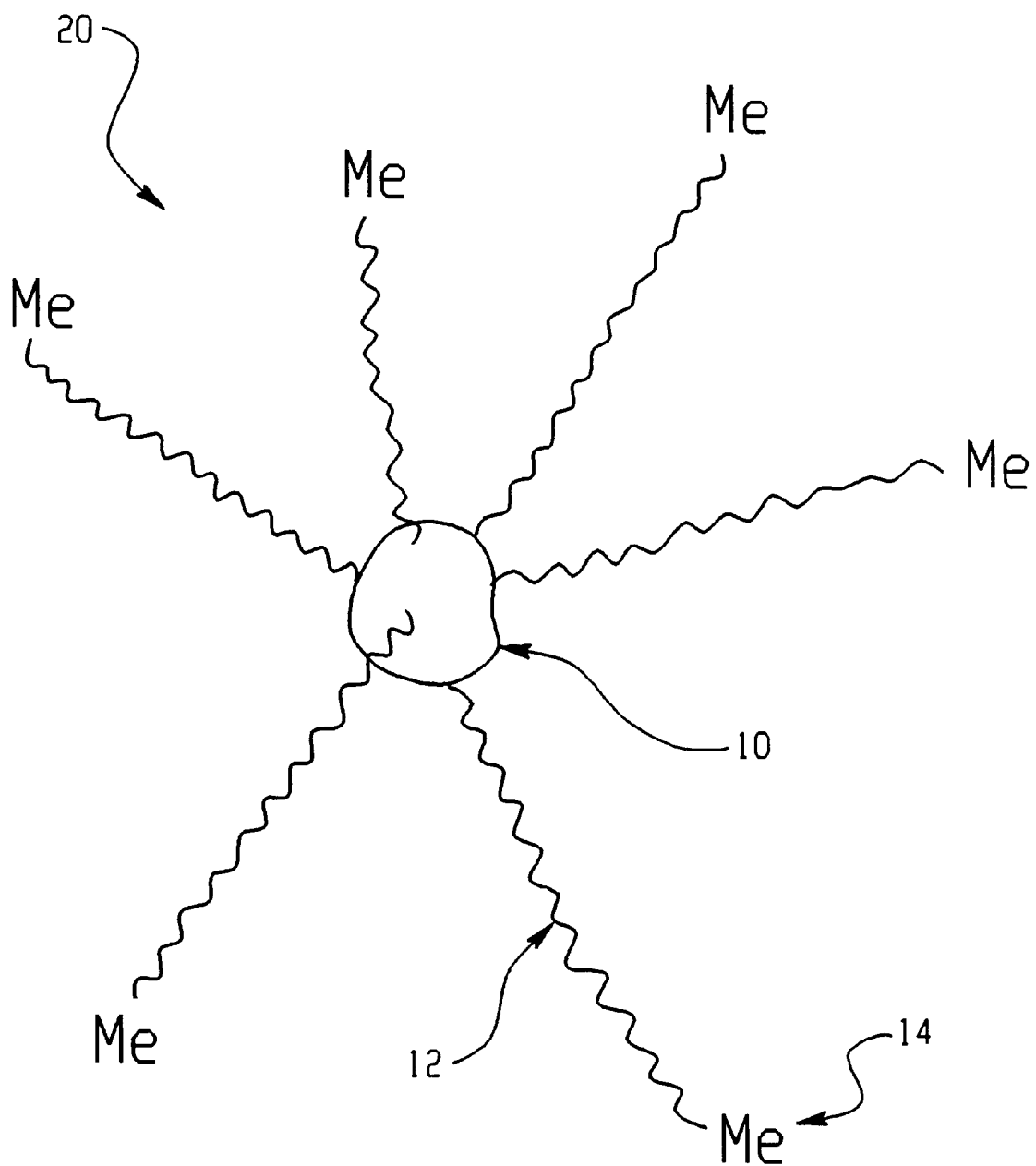
FIG. 5 is a schematic illustration of the macro-branched diene polymer formed with the metalated catalysts illustrated in FIGS. 1 to 4.

The metalated catalysts prepared according to the method for this embodiment of the invention are employed in a gas phase polymerization process to yield macro-branched diene polymers illustrated in FIG. 5 having the formula

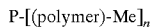

prior to quenching, wherein P, Me and n are the same as described above, and (polymer) represents a polymer chain covalently bonded to the particle, wherein the polymer component of the polymer chain is selected from conjugated diolefin monomers having from about 4 to about 12 carbon atoms, and copolymers of the conjugated diolefin monomers together with monovinyl aromatic monomers having from about 8 to about 20 carbon atoms, as described further below. Preferably, the monomers are selected from styrene, butadiene, isoprene, and mixtures of these. As described below, vulcanizable elastomer compositions are prepared from these macro-branched diene polymers by compounding the polymers with about 5 to about 80 parts by weight of carbon black per 100 parts by weight of the polymer. Preferably, the elastomer composition comprises a selection from the group consisting of styrene butadiene rubber, polybutadiene rubber, polyisoprene rubber, isoprene butadiene rubber, terpolymer rubbers comprising of styrene, butadiene and isoprene, and mixtures of these rubbers.

A method for gas phase anionic polymerization of conjugated diene monomers employing the solid supported metalated catalysts of this embodiment of the invention comprises the steps of (1) charging into a gas phase reaction zone (a) the solid supported metalated anionic polymerization catalyst described above, having particles that comprise bound rubber, or the thermoplastic polymer or cured elastomer described above, and (b) at least one anionically polymerizable conjugated diene monomer described above; (2) allowing the monomer to polymerize to form a polymer, and (3) withdrawing the polymer from the reaction zone. As described below, the catalyst is generally in suspension in a hydrocarbon solvent, and the method preferably further comprises the step of removing the solvent from the reaction zone prior to charging the monomers.

A method for gas phase anionic polymerization of conjugated diene monomers employing a solid supported free n-butyl lithium catalyst described above, comprises the steps of (1) consecutively charging into a gas phase reaction zone (a) a solid supported anionic polymerization catalyst comprising (i) a multiplicity of particles having a diameter of 1 to about 1000 microns comprising a selection from the group consisting of a thermoplastic polymer having a $T_g$ of 80° C. to about 300° C., a cured elastomer, a bound rubber, a carbon black, a graphitized carbon black, and mixtures thereof, and (ii) an oil containing dissolved n-butyl lithium, wherein the oil forms a coating on the surface of the particles such that a multiplicity of molecules of n-butyl lithium are absorbed on the particles; (b) a polar coordinator; and (c) an anionically polymerizable conjugated diene monomer selected from conjugated diolefin monomers having from about 4 to about 12 carbon atoms, and the diolefin monomers together with monovinyl aromatic monomers having from about 8 to about 20 carbon atoms; (2) allowing the monomers to polymerize to form a polymer; and (3) withdrawing the polymer from the reaction zone. The molar ratio of the polar coordinator to the alkali metal compound ranges from about 0.03:1 to about 4:1, preferably about 0.05:1 to about 1:1, and more preferably about 0.06:1 to about 0.5:1.

Various techniques for gas phase polymerizations, such as batch, semi-batch and continuous polymerization may be employed. When using a batch or semi-batch gas phase polymerization process, the method preferably further comprises the step of terminating the polymerization with a terminating or functionalizing agent described below prior to withdrawing the macro-branched diene polymer from the reaction zone. If a continuous gas phase polymerization process is employed, the polymerization reaction is terminated outside of the reaction zone.

The polymerization is carried out by contacting the conjugated diene monomers with the described solid supported catalysts in the reaction zone of any reactor suitable for gas phase polymerization, for example in a stirred reactor, in a rotary reactor or in a fluidized-bed reactor or in any combination of these various reactor types. Such reactors are well known to those skilled in the art, as are the temperatures and pressures under which polymerization may take place. The metalated catalyst is charged to the reaction zone in a slurry as a suspension in a hydrocarbon solvent. Thus, when using this catalyst, the method preferably further comprises the step of removing the solvent from the reaction zone prior to charging the monomers, such as by purging the reaction zone with nitrogen or another inert gas. The conjugated diene monomers for charging into the reaction zone are generally delivered neat. The polymerization reaction is carried out under anhydrous, anaerobic conditions in an inert gas, such as nitrogen and the like. The polymerization may be carried out under pressures of 1 mbar to 50 bar, preferably under pressures of 1 to 20 bar. The polymerization is generally carried out at any convenient temperature, such as about −20° C. to about 250° C. For batch polymerizations, it is preferred to maintain the peak temperature at from about 49° C. to about 149° C., and more preferably from about 80° C. to about 120° C. Polymerization is allowed to continue under agitation for about 0.15 to 24 hours.

Typically, the catalyst is used to polymerize unsaturated hydrocarbon monomers such as butadiene, isoprene and the like, and copolymers thereof with monovinyl aromatics such as styrene and its derivatives (e.g., α-methyl styrene, p-methyl styrene), and the like. Thus, the macro-branched elastomeric products include diene homopolymers from monomer A and copolymers thereof with monovinyl aromatic monomers B. Exemplary diene homopolymers are those prepared from conjugated diolefin monomers having from 4 to about 12 carbon atoms. Exemplary vinyl aromatic copolymers are those prepared from monomers having from 8 to about 20 carbon atoms. Preferred macro-branched elastomers include diene homopolymers, such as polybutadiene and polyisoprene and copolymers, such as styrene butadiene rubber and isoprene butadiene rubber, and terpolymers consisting of styrene, butadiene and isoprene. Copolymers and terpolymers can comprise from about 99 to 10 percent by weight of diene units and from about 1 to about 90 percent by weight of monovinyl aromatic units, totaling 100 percent. The polymers, copolymers and terpolymers of the present invention may have 1,2-microstructure contents ranging from about 10 to about 80 percent, with the preferred polymers, copolymers or terpolymers having 1,2-microstructure contents of from about 25 to 65 percent, based upon the diene content.

The elastomeric copolymers are preferably random copolymers which result from simultaneous copolymerization of the monomers A and B with randomizing agents, as is known in the art. Block copolymers, poly (b-styrene-b-butadiene-b-styrene) are thermoplastic elastomers, sometimes referred to as S-B-S polymers.

The catalysts of the present invention form "living" macro-branched diene polymers from the foregoing monomers. FIG. 5 is a schematic representation of a macro-branched polymer 20 produced employing the invention metalated catalysts. A polymer chain 12 is polymerized from each metalated site of the highly swollen particle 10. The metal 14 is carried on the living end of the polymer chain prior to quenching. As described above, each particle may comprise from three to a multiplicity of polymer chains, the number of which may be measured as multiples of 10, e.g., $10^{19}$. Moreover, polymer chains may be produced at metalated sites in the inner matrix of the particle, since polymerizable monomers are dissolved in solvent that can enter the particle and are also soluble in both the particle and in the growing polymer chains.

Figure 7:
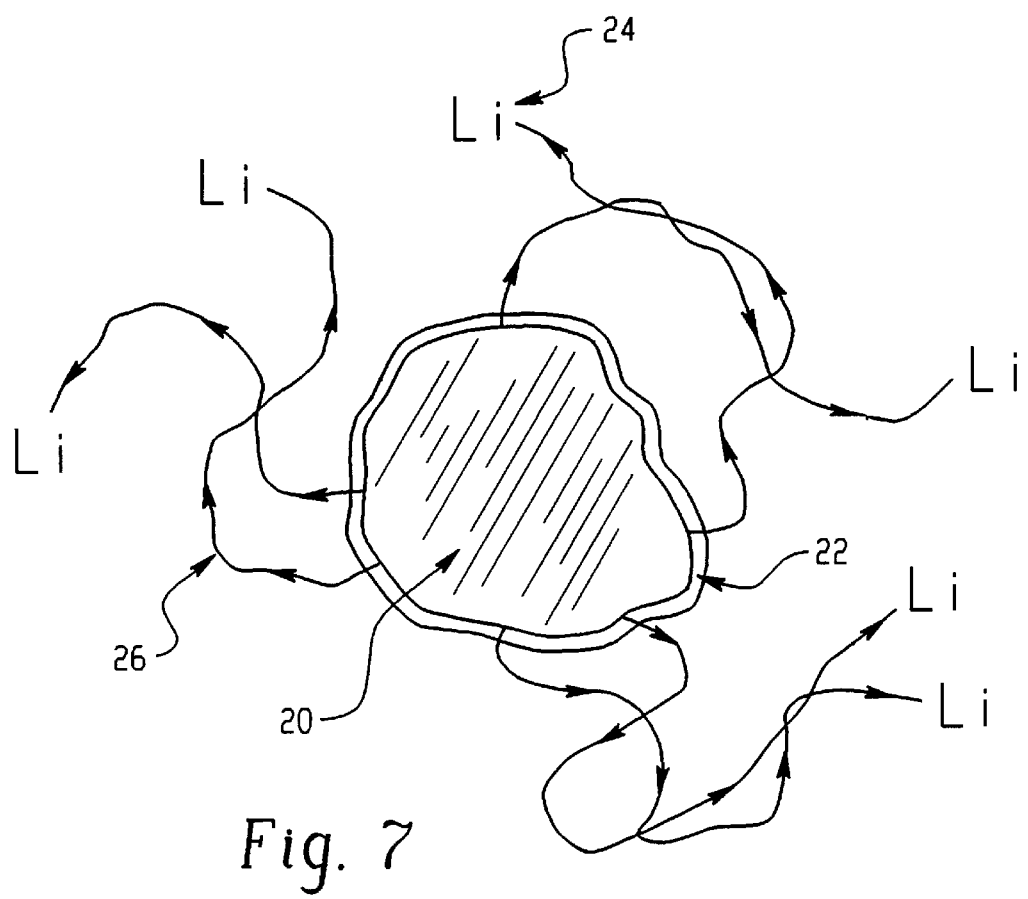
FIG. 7 is a schematic illustration of diene polymer chains formed when the particle of FIG. 6 is employed as a catalyst.

As described above, when particles having absorbed free n-butyl lithium are employed, as illustrated in FIG. 7, the resulting polymer chains are not covalently bonded to the particle, but rather may remain attached to the particle by entanglement or intertwining with other growing polymer chains.

The polymer chains may be any of the foregoing diene homopolymers, monovinyl aromatic homopolymers, diene/monovinyl aromatic random copolymers, block copolymers, or mixtures of any of the foregoing. Typically, about 0.5% to about 1% of the polymer product may comprise the original particle used in the catalyst. However, the concentration of the particle in the product can be changed by varying parameters such as the degree of metalation of the particles, e.g., by changing the catalyst preparation ingredient concentrations, the particle sizes, and the like, or changing the concentration of monomers charged to the reaction zone in the polymerization reactions, and the like.

If a continuous gas phase polymerization reaction is employed, after polymerization is complete, the resulting polymer is terminated outside of the reaction zone by a protic quenching agent such as water, steam or an alcohol, such as isopropanol, or a functionalizing agent described below, to obtain a macro-branched diene polymer. The terminating agent is added to the reaction vessel, and the vessel is agitated for about 0.1 to about 4.0 hours. Quenching is usually conducted by stirring the polymer and quenching agent for about 0.25 hours to about 1.0 hour at temperatures of from about 30° C. to about 120° C. to ensure a complete reaction.

If a batch or semi-batch gas phase polymerization reaction is employed, the polymerization reaction is terminated in the reaction zone by charging a functionalizing agent to the reaction zone.

Lastly, any solvent that may be present after termination of the polymerization reaction is removed from the polymer by conventional techniques. These include steam or alcohol coagulation, thermal desolventization, or any other suitable method. Additionally, solvent may be removed by drum drying, extruder drying, vacuum drying or the like. Desolventization by drum-drying, coagulation in alcohol, steam or hot water desolventization, extruder drying, vacuum drying, spray drying, and combinations thereof are preferred. An antioxidant, such as butylated hydroxy toluene (BHT) and/or an antiozonant compound is usually added to the polymer after removal from the reaction zone.

Functionalizing agents are compounds that provide a functional group that remains on the end of the polymer chain. Any compounds providing terminal functionality (e.g., "endcapping") that are reactive with the polymer bound metal can be selected to provide a desired functional group. However, it is preferable that the functionalizing agents are not also coupling agents (i.e., the functionalizing agents should not couple together the chain ends) so that the branched structure of the polymer is maintained. Functionalizing agents are particularly preferred when elastomers are polymerized by the process of the invention because the functional group promotes uniform and homogeneous mixing with fillers, such as silica and carbon black. Therefore, for example, compounding of vulcanizable macro-branched elastomers, prepared by the process of the invention, results in rubber products exhibiting improved physical properties, such as reduced hysteresis, which means a rubber product having increased rebound, decreased rolling resistance in tires, and lessened heat build-up when subjected to mechanical stress. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidinones, tributyl tin chloride, and mixtures of these. Further examples of reactive compounds include the terminators described in U.S. Pat. Nos. 5,066,729 and 5,521,309, the subject matter of which, pertaining to terminating agents and terminating reactions, is hereby incorporated by reference. The practice of the present invention is not limited solely to these terminators, since other compounds that are reactive with the polymer bound alkali metal can be selected to provide a desired functional group.

The final polymerization products, the macro-branched diene polymers produced by the gas phase polymerization process, are light, granular, and resemble fish caviar. The polymers are not sticky and do not produce agglomerates. The product, which contains the catalyst particle, may then be compounded or milled to disperse the thermoplastic polymer particle or shear-degrade the bound rubber particle or the cured elastomer particle in the center of the polymer, as described above, and reduce the polymer to a base molecular weight.

Usually each of the polymer chains of the macro-branched polymer have a molecular weight of about 20,000 to about 500,000, preferably about 100,000 to about 200, 000, thus producing a macro-branched polymer having molecular weights that are several orders of magnitude higher than known linear polymers as measured by conventional gel permeation chromatographic (GPC) techniques. Preferably, the polydispersity (the ratio of the molecular weight to the number molecular weight) of the polymers can be controlled over a wide range, from 1 to about 20, preferably 1 to about 5, and more preferably 1 to about 2.

A theoretical calculation of the molecular weights possible for the macro-branched polymers is presented below. The calculation assumes a 200-mesh ground tire rubber particle and uses the metalated catalyst labeled #3 illustrated in Table 1.

---

Assuming particles are uniformly shaped spheres with:
d = 74 $\mu$m
r = 37 $\mu$m
Assuming uniform density of ground tire rubber as:

$$\rho = 1.16 * 10^6 \frac{\text{gm}}{\text{m}^3}$$

Surface Area of Sphere:
A = 4 * $\pi$ * $r^3$
Volume of Sphere:

$$V = \frac{4}{3} * \pi * r^3$$

Mass of 1 particle:

$$\text{mass} = V * \rho = \frac{4}{3} * \pi * r^3 * \rho$$

mass = 0.246 $\mu$gm
Number particles per gm ground tire rubber:

-continued $$\frac{\text{\# particles}}{\text{gm ground tire}} = \frac{1}{0.246\ \mu\text{gm}} = 4.065*10^6 \frac{\text{particles}}{\text{gm ground tire}}$$

\# of living sites per particle:

$$\frac{\text{\# living sites}}{\text{particle}} = \frac{(\text{"X" mmol Li}^+)}{(\text{gm ground tire})} *$$

$$\frac{(\text{gm ground tire})}{(\text{"Y" \# particles})} * \frac{(6.022*10^{23}\ \text{molecules})}{(\text{mol})} * \frac{(\text{mol})}{(1000\ \text{mmol})}$$

$$\frac{\text{\# living sites}}{\text{particle}} = 6.0*10^{20} * \frac{X}{Y}$$

If 40 gm of monomers are polymerized using 10 cc of catalyst #3 (assume a molarity of 0.33), the expected molecular weight would be:

MW=approximately 26,000

$$\frac{\text{\# MW}}{\text{particle}} = 1.6*10^{19} \frac{\text{MW}}{\text{particle}}$$

The highly branched polymers produced according to the invention exhibit desirable properties in addition to their very high molecular weight. For example, the polymers exhibit excellent oil absorption properties and are easily compounded. They are also readily mixed with other polymers, such as styrene butadiene rubber, natural rubber, polybutadiene, and the like, to form a polymer blend. The invention polymers do not "cold flow" (i.e. a polymer "ball" retains its integrity as a ball over time, in contrast to a polymer that does exhibit "cold flow" and would "puddle").

The macro-branched polymers synthesized by the process of the invention may also be compounded to form vulcanizable elastomeric compounds and articles that exhibit excellent resistance to wear and tear and reduced hysteresis properties. Articles, such as tires, shock absorbers, mounts, power belts and the like, will show an increase in rebound, a decrease in rolling resistance and have less heat build-up when mechanical stresses are applied, resulting in improved fuel economy. Decreased rolling resistance is, of course, a useful property for pneumatic tires, both radial as well as bias ply types and thus, the vulcanizable elastomeric compositions of the present invention can be utilized to form treadstocks for such tires. The composition can also be used to form other elastomeric tire components such as subtreads, black sidewalls, body ply skims, bead fillers and the like.

The polymers of the present invention can be utilized as 100 parts of the rubber in the treadstock compound, or they can be blended with any conventionally employed treadstock rubber which includes natural rubber, synthetic rubber and blends thereof. When the polymers of the present invention are blended with conventional rubbers, the amounts can vary widely with a lower limit comprising about 10 to 20 percent by weight of the total rubber. The minimum amount will depend primarily upon the degree of hysteresis reduction desired. Thus, the compounds can contain 10–100% by weight of the inventive polymer, with the balance, if any, being a conventional rubber.

The polymers can be compounded with all forms of carbon black in amounts ranging from about 5 to 80 parts by weight, per 100 parts of rubber (phr), with about 35 to 60 phr being preferred. The carbon blacks may include any of the commonly available, commercially-produced carbon blacks. Examples of preferred carbon black compounds are described in U.S. Pat. No. 5,521,309, the subject matter of which, relating to carbon black compounds, is incorporated by reference herein. Silica can be used in place of all or part of the carbon black.

The reinforced rubber compounds can be cured in a conventional manner with known vulcanizing agents at about 0.1 to 10 phr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials", pp. 390–402. Vulcanizing agents can be used alone or in combination.

Vulcanizable elastomeric compositions of the invention can be prepared by compounding or mixing the macrobranched polymers herein, with carbon black and other conventional rubber additives including, for example, fillers, such as silica, plasticizers, antioxidants, curing agents and the like, using standard rubber mixing equipment and procedures. Such elastomeric compositions, when vulcanized using conventional rubber vulcanization conditions, have reduced hysteresis properties and are particularly adapted for use as tread rubbers for tires having reduced rolling resistance.

EXAMPLES AND GENERAL EXPERIMENTAL PROCEDURE

Catalyst Preparation

In order to demonstrate the preparation and properties of the solid supported anionic catalysts prepared according to the present invention, bound rubber particles (carbon black-styrene butadiene rubber particles or carbon black-natural rubber particles) were prepared and reacted with a lithium hydrocarbyl compound in the presence of a polar coordinator to form multi-lithiated bound rubber particles. (Example 1)

Other solid supported anionic catalysts were prepared, as described in our copending patent application Ser. No. 09/042,096 by reacting thermoplastic polymer particles or scrap rubber, natural rubber or styrene butadiene rubber particles with the lithium hydrocarbyl compound in the presence of a polar coordinator to form multi-lithiated thermoplastic polymer particles or cured rubber particles, respectively. (Examples 2 and 3).

Example 4 illustrates the preparation of a free BuLi catalyst in mineral oil for use in a solid supported gas phase anionic polymerization process.

The catalysts so prepared were then used for gas phase polymerization of butadiene monomers.

The described particles, alkyl metal compound, polar coordinators, and solvents are intended to be only examples of those that may be used in the process of the invention, and their particular use is not intended to be limiting, as other metalatable particles, alkali metal compounds, polar coordinators and solvents may be utilized by those skilled in the art.

Catalyst Preparation Procedure

Example 1

This example describes the preparation of a metalated catalyst employing a carbon black-styrene butadiene bound rubber particle or a carbon black-natural rubber bound rubber particle as the solid support. The bound rubber particles are prepared by adding 140 grams of styrene butadiene rubber or natural rubber to a 300 gram capacity Brabender/Banbury mixer and mixing at 140° F. with a rotor speed of 60 rpm. Then 140 grams of carbon black (N 110) are gradually added to the mixer until the contents in the mixer are pulverized. Excess unbound carbon black remains in the mixture.

The catalyst employing the bound rubber particles is prepared in a 32-ounce beverage bottle that is dried by baking for at least 16 hours at 115° C. and then capped with a crown, two-hole cap and rubber liner. The bottle is cooled while purging with dry nitrogen. To the bottle is added 6 grams of the particles. The bottle is then capped and 20 ml of hexane is added, followed by purging with nitrogen. Then 1.8 milliliters (ml) of 6.62 molar (M) tetramethyl ethylene diamine (TMEDA) or, alternatively, 8 ml of 1.8M 2-2'-di(tetrahydrofuryl)propane (OOPS), is added, followed by 10 ml of a 1.6M solution of BuLi in hexane. The bottle is heated in a 50° C. rotating bottle bath for 24 hours. The bottle is then removed from the bottle bath, allowed to cool to room temperature was removed. The solid supported catalyst in suspension is then stored under pressure in a cool environment (refrigerator) to prevent decomposition of the catalyst.

This procedure was used to prepare different solid supported catalysts employing bound rubber as the particle with the variations in ingredient concentrations as listed in Table 1.

Example 2

This example describes the preparation of a catalyst using a thermoplastic polymer as the particle. The polymer employed is a copolymer of modified styrenes having a molecular weight of 2,900 and $T_g$ of 100° C., with the brand name ENDEX® 155 (Hercules Inc., Wilmington, Del.). The catalyst is prepared in a 32-ounce beverage bottle that is dried by baking for at least 16 hours at 115° C. and then capped with a crown, two-hole cap and rubber liner. The bottle is cooled while purging with dry nitrogen. To the bottle is added 5.3 grams of ENDEX®. Fifteen to 20 dry marbles are added to the bottle. The bottle is then capped and 35 ml of hexane is added, followed by purging with nitrogen. Then 1.2 ml of 6.62M TMEDA is added, followed by 15 ml of a 1.6M solution of BuLi in hexane. The bottle is heated in a 50° C. rotating bottle bath for 24 hours. The bottle is then removed from the bottle bath, allowed to cool to room temperature, and excess liquid was removed. The bottle is vigorously shaken on a mechanical shaker to smash large particles into small ones. The particles are then re-suspended in 50 grams of hexane. The solid supported catalyst in suspension is then stored under pressure in a cool environment (refrigerator) to prevent decomposition of the catalyst.

This procedure was used to prepare different solid supported catalysts employing the thermoplastic copolymer, ENDEX® as the particle with the variations in ingredient concentrations as listed in Table 1.

Example 3

This example describes the preparation of solid supported catalysts employing 200 mesh ground scrap tire rubber (Rouse Rubber Industries) as the particles. Prior to use in preparing the catalyst, the particles are extracted with acetone for at least 16 hours to remove substantially all curatives. The catalyst is prepared in a 32-ounce beverage bottle that is dried by baking for at least 16 hours at 115° C. and then capped with a crown, two-hole cap and rubber liner. The bottle is cooled while purging with dry nitrogen.

To the bottle was added 4.5 grams of the ground scrap rubber particles. The bottle was then capped and 50 grams of hexane was added, followed by purging with nitrogen. Then 1.9 milliliters (ml) of 6.62 molar (M) tetramethyl ethylene diamine (TMEDA) was added, followed by 100 grams of 3% by weight n-butyl lithium (BuLi) in hexane. The bottle was heated in a 50° C. rotating bottle bath for 24 hours. The bottle was then removed from the bottle bath and allowed to cool to room temperature.

To remove any free BuLi remaining, an initial hexane dilution is added (55 grams) and the bottle is allowed to sit still while the particles in the bottle fall to the bottom. The top layer of solvent is then removed (96 grams), and a second dilution of hexane is added (113 grams). The bottle is vigorously shaken and then allowed to sit while the particles again fall to the bottom. The second solvent extract is then removed from the bottle (109 grams). A third dilution is added (102 grams) of hexane, a third extraction is performed (206 grams) and the particles are then re-suspended in 50 grams of hexane. Analysis by titration of butane evolution by alcohol termination gave 89% of the BuLi as reacted, and thus the final suspension has a concentration of 0.33 M.

The solid supported catalyst in suspension is then stored under pressure in a cool environment (refrigerator) to prevent decomposition of the catalyst.

This procedure was used to prepare different solid supported catalysts employing cured rubber as the particle with the variations in ingredient concentrations as listed in Table 1.

Example 4

This example describes the preparation of a free BuLi catalyst in mineral oil for use in a solid supported gas phase polymerization process.

The catalyst is prepared in a 32-ounce beverage bottle that is dried by baking for at least 16 hours at 115° C. The solid support particles (see Table 1) and a magnetic stirring bar are inserted into the bottle which is then capped with a crown, two-hole cap and rubber liner. The bottle is cooled while purging with dry nitrogen.

To the bottle was added 145 ml of 1.6M n-butyl lithium in hexane, followed by the addition of 100 grams of mineral oil. The bottle was then placed on a mechanical stirrer and subjected to a slight vacuum to remove the hexane solvent.

This prepared catalyst was then stored under pressure in a cool environment (refrigerator) to prevent decomposition.

Characterization of Catalysts

Some properties of the catalysts prepared as in Examples 1, 2 and 3 are listed in Table 1. As illustrated in the Table, a low ratio of the polar coordinator (modifier, Mod.) to BuLi resulted in a high percentage of the original lithium (from the BuLi) active and bound to the particles. Moreover, a high percentage of bound lithium illustrates that there was a low amount of impurities present in the particles before binding of the metal (due to absorbed water, hydroxyl groups, carboxyl groups, and the like). The calculated molarities of the individual catalysts in hexane are also listed.

Polymer Preparation

The following examples illustrate three methods of semi-batch gas phase anionic polymerization of polybutadiene using the invention catalysts, i.e., the "Small Particle Injection Method" and the "Large Particle Dry Box Transfer Method" suitable for the particulate catalysts prepared as in Examples 1, 2 and 3, and the "Free BuLi on a Solid Support Method" suitable for the catalyst prepared with free BuLi in mineral oil prepared as in Example 4. The examples of the methods are not intended to be limiting, as other gas phase anionic polymerization methods for preparing these and other polymers, such as styrene-butadiene rubber, from the invention catalysts may be determined by those skilled in the art. The reaction temperatures and pressures for copolymerizing styrene and butadiene to form styrene-butadiene rubber are also known by those skilled in the art and this copolymer can be produced by the described methods at the proper temperatures and pressures without undue experimentation.

Small Particle Injection Method

This example illustrates a semi-batch method for gas phase anionic polymerization of butadiene monomers in the presence of a catalyst employing ground rubber as the particle, prepared as in Example 2.

The polymerization is carried out in a fluted 1000 ml round bottom flask with a sample port connected to a supply of butadiene monomer (neat) that is maintained in a water bath that acts as a heat sink. The monomer supply also has a valve for metering the monomer into the flask. The flask further has an input port fluidly connected to a supply of gaseous nitrogen and an exit port fluidly connected to a vacuum pump. The nitrogen supply to the flask ss monitored by known means, such as by using a pressure meter or a "bubbler" (approximately 2" of mineral oil) in conjunction with the vacuum pump. The presence of bubbles indicates a flow of nitrogen through the flask. The flask is further clamped to a rotary evaporator, The inclination of the rotary evaporator is adjusted in such a way that the axis of rotation allows the reactants in the flask to cascade or tumble rather than slide over the fluted flask bottom.

The following general steps for the polymerization process were used for preparation of each of the polymers #P1 to #P6 listed in Table 2, employing the amounts of catalysts #1 to #5 listed in Table 1. The butadiene monomers are continually slowly metered into the flask until the desired degree of polymerization has taken place and the polymerization reaction is stopped.

To begin polymerization, the flask is first purged with nitrogen. The catalyst (in the form of a slurry in a solvent, such as hexane) is then charged into the flask and rotation of the flask at approximately 30 rpm is initiated. The flask is then heated in a 50° C. to 65° C. water bath or is rigorously purged with nitrogen until substantially all of the solvent introduced with the catalyst is removed from the flask.

Following removal of the solvent, a slight positive pressure (approximately 3 mm Hg) is established in the flask by a flow of nitrogen. When the pressure is achieved, the butadiene monomers are slowly metered into the flask until all the nitrogen has been replaced by butadiene and the slight positive pressure is maintained. The supply of nitrogen is then stopped and the pressure in the flask is monitored by maintaining a positive pressure on the bubbler.

Polymerization of the butadiene monomers is allowed to proceed for 2 hours. During this period, the flask gradually fills with the "caviar"-like macro-branched polybutadiene polymers. The supply of butadiene monomers is then stopped and the flask is rigorously purged with nitrogen.

Following the nitrogen purge, a protic terminator (e.g., isopropyl alcohol) or a functionalizing agent is charged to the flask, followed by a charge of an antioxidant. The contents of the flask are then removed and any remaining solvent (e.g., from the antioxidant) is removed from the resulting polymer, such as by drum drying.

Large Particle Dry Box Transfer Method

This example illustrates a semi-batch method for gas phase anionic polymerization of butadiene monomers in the presence of a catalyst employing bound rubber particles or thermoplastic polymer particles, prepared as in Examples 1 and 3, respectively. The polymerization is carried out in an identical semi-batch gas polymerization system employing a fluted 1000 ml round bottom flask as that used for the "Small Particle Injection Method". However, this method is used for large particle catalysts that are not readily syringed into the input port of the flask.

The following general steps for the polymerization process were used for preparation of each of the polymers #P7 to #P10 listed in Table 2, employing the amounts of catalysts #9, #10, #7 and #8, respectively.

In this method, the solvent has been removed from the particulate catalysts prior to initiating polymerization. The large metalated dry catalyst particles are added to the open flask and the flask is then closed and purged with nitrogen. Rotation of the flask at approximately 30 rpm is initiated and the flask is maintained in a 50° C. to 65° C. water bath. A slight positive pressure (approximately 3 mm Hg) is then established in the flask by a flow of nitrogen. When the pressure is achieved, the butadiene monomers are slowly metered into the flask until all the nitrogen has been replaced by butadiene and the slight positive pressure is maintained. The polymerization then proceeds as for the "Small Particle Injection Method".

Free BuLi on a Solid Support Method

This example illustrates a semi-batch method for gas phase anionic polymerization of butadiene monomers in the presence of a catalyst employing a solution of free BuLi in mineral oil, prepared according to Example 4. The polymerization is carried out in an identical semi-batch gas polymerization system employing a fluted 1000 ml round bottom flask as that used for the "Small Particle Injection Method".

The following general steps for the polymerization process were used for preparation of each of the polymers #P12 to #P16 listed in Table 2, employing the amounts of catalysts #F-1 to #F-5 listed in Table 1. Polymerization takes place in the presence of a polar coordinator, such as TMEDA or OOPS in a ratio of 0.25:1 of the polar coordinator to the BuLi. The butadiene monomers are continually slowly metered into the flask until the desired degree of polymerization has taken place and the polymerization reaction is stopped.

In this method, solid carrier particles are first added to the open flask. The particles have a diameter of 1 to about 1000 microns and may be carbon black, graphitized carbon black, ground scrap rubber, bound rubber, polyethylene, and the like. The amount (grams) and types of particles added to flask are listed in Table 2. The flask is then closed and purged with nitrogen. BuLi dissolved in mineral oil, prepared according to Example 4, in the amounts listed in Table 2, is then charged into the flask, followed by a charge of the polar coordinator, such as 6.62M TMEDA or 1.8M OOPS, at a ratio of 0.25:1 of the polar coordinator to the BuLi. Rotation of the flask at approximately 30 rpm is initiated and the flask is maintained in a 50° C. to 65° C. water bath. A slight positive pressure (approximately 3 mm Hg) is then established in the flask by a flow of nitrogen. When the pressure is achieved, the butadiene monomers are slowly metered into the flask until all the nitrogen has been replaced by butadiene and the slight positive pressure is maintained. The polymerization then proceeds as for the "Small Particle Injection Method".

Gas Phase Polymerization Products
Characterization

As illustrated in Table 2, each of the polymer products had an acceptable $T_g$ between −27.8° C. and −84.7° C. The "solubles" represent polymers having relatively few polymer chains attached to the particle, such polymers being soluble in a solvent such as toluene. The number molecular weights (Mn) of the soluble polymers, ranging from 3,700 to 198,300 with a low polydispersity, thus are representative of the minimum molecular weights of the multi-branched polymers having a large number of polymer chains. The preferred polymers have a low percentage of soluble polymers representing a high percentage of macro-branched polymers.

Polymers P-12 to P-16 represent polymers produced when solid supported free BuLi was used as the catalyst. A significant amount of polymers P-13 to P16 was produced when the BuLi was absorbed to the particles, in comparison to polymer P-12 which represents the product of a polymerization reaction where inert particles were not used in the flask and the oil containing the BuLi was allowed to coat only the inside of the flask.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

TABLE 1

CHARACTERIZATION OF CATALYSTS

| Catalyst Number | 200 Mesh Acetone-Extracted Scrap Rubber (grams) | CB—SBR* Bound Rubber (grams) | CB—NR** Bound Rubber (grams) | TP*** (grams) | Hexane (ml) | 1.6M BuLi in Hexane (ml) | (Modifier) 6.62M TMEDA (ml) | (Modifier) 1.8M OOPS (ml) | Mod: BuLi Ratio | No. Hexane Rinses (ml) | Catalyst Molarity | % Active Lithium Bound to Particle |
|---|---|---|---|---|---|---|---|---|---|---|---|---|
| 1 | 5 | | | | 50 | 30 | 2 | | 0.28 | 2 (150) | | |
| 2 | 4 | | | | 100 | 25 | 1.5 | | 0.25 | 2 (150) | | |
| 3 | 4.6 | | | | 150 | 12 | 0.72 | | 0.25 | 2 (250) | | |
| 4 | 5 | | | | 100 | 20 | 1.2 | | 0.25 | 3 (200) | 0.0317 | 74 |
| 5 | 5 | | | | 100 | 20 | 1.2 | | 0.25 | 3 (200) | | |
| 6 | | | 6 | | 20 | 10 | 1.8 | | 0.74 | 0 | | |
| 7 | | | | 5.3 | 18 | 15 | 1.2 | | 0.33 | 0 | 0.2474 | 95 |
| 8 | | | | 10.6 | 20 | 20 | | 4.4 | 0.25 | 0 | 0.3800 | 88 |
| 9 | | 6 | | | 0 | 10 | | 8 (0.5M) | 0.25 | 0 | 0.1368 | 49 |
| 10 | | 18 | | | 0 | 30 | | 24 (0.5M) | 0.25 | 0 | 0.1974 | 44 |

*Bound rubber: carbon black-styrene butadiene rubber
**Bound rubber: carbon black-natural rubber
***Thermoplastic copolymer of modified styrenes, MW 2,900, $T_g$ 100° C.

TABLE 2

GAS PHASE PRODUCTS CHARACTERIZATION

| Catalyst Type | Catalyst Number (ml) | Polymer Number | Inert Particle Type (grams) | Polymer Weight (grams) | $T_g$ (° C.) | Solubles Mn ($\times 10^{-3}$) | Polydispersity | % soluble |
|---|---|---|---|---|---|---|---|---|
| Metalated Scrap Rubber | | | | | | | | |
| | 1 (16) | P1 | | 267 | −84.7 | 11.0 | 1.67 | |
| | 2 (25) | P2 | | 98 | −80.0 | | | |
| | 3 (25) | P3 | | 106 | −49.3 | | | |
| | 4 (25) | P4 | | 76 | −47.4 | 18.4 | 2.33 | 5.9 |
| | 4 (25) | P5 | | 90 | −81.2 | 28.2 | 2.38 | 7.8 |
| | 5 (50) | P6 | | 120 | −32.5 | 18.0 | 2.36 | |
| Simple Carbon Black-Polymer Network | | | | | | | | |
| | 9 | P7 | (1 gram) | 20 | −33.4 | 125.4 | 2.43 | 92.8 |
| | 10 | P8 | (10 grams) | 108 | −31.8 | 198.3 | 3.50 | 80.0 |

TABLE 2-continued

GAS PHASE PRODUCTS CHARACTERIZATION

| Catalyst Type | Catalyst Number (ml) | Polymer Number | Inert Particle Type (grams) | Polymer Weight (grams) | $T_g$ (°C.) | Solubles Mn (× $10^{-3}$) | Polydispersity | % soluble |
|---|---|---|---|---|---|---|---|---|
| Metalated Thermoplastic Polymer | | | | | | | | |
| | 7 (15) | P9 | | 20 | −29.7 | 174.7 | 2.60 | |
| | 8 (20) | P10 | | 23 | −27.8 | 16.5 | 12.77 | |
| Free BuLi in Mineral Oil | | | | | | | | |
| | F-1 (1.4M, 1.5) | P-12 | 0 | 6 | | 3.7 | 5.40 | |
| | F-2 (1.4M, 6.0) | P-13 | g.s.r.* (19.5) | 13 | −67.7 | 14.2 | 3.05 | 36.4 |
| | F-3 (1.4M, 10.0) | P-14 | g.c.b.** (36.0) | 57 | −34.0 | 27.3 | 9.32 | 32.1 |
| | F-4 (1.4M, 10.0) | P-15 | PE*** (30.0) | 26.3 | −43.3 | | | |
| | F-5 (1.6M, 10.0) | P-16 | g.s.r* (26.5) | 24.4 | −52.9 | 9.6 | 7.04 | 39.1 |

*g.s.r. = 200 mesh ground scrap rubber (Rouse Rubber Industries) (acetone-extracted)
**g.c.b. = graphitized carbon black (N 343)
***PE = 35 mesh (Aldrich Chemical Company)

We claim:

1. A solid supported anionic polymerization catalyst suitable for gas phase polymerization of conjugated diene monomers, having the formula $P(Me)_n$ wherein P is a metalatable particle having a diameter of about 1 micron to about 1000 microns comprising a bound rubber, Me is a Group IA alkali metal atom covalently bonded to the carbon atom of the particle, and n is an integer equal to or greater than 3.

2. The catalyst of claim 1, wherein the bound rubber is selected from the group of consisting of carbon black-styrene butadiene rubber, carbon black-polybutadiene rubber, carbon black-polyisoprene rubber, carbon black-styrene isoprene rubber, carbon black-styrene butadiene isoprene rubber, and carbon black-natural rubber.

3. The catalyst of claim 1, wherein the alkali metal atoms are selected from the group consisting of lithium sodium and potassium atoms.

4. The catalyst of claim 3, wherein the alkali metal atoms are lithium atoms.

5. The catalyst of claim 1, wherein the alkali metal atoms are a mixture of atoms of lithium and at least one atom selected from the group consisting of sodium, potassium, rubidium, cesium and francium.

6. The catalyst of claim 5, wherein the particle comprises an outer surface and an inner matrix, and the alkali metal atoms are covalently bonded to the outer surface or to the inner matrix or to both the outer surface and the inner matrix.

7. A method for preparing a solid supported anionic polymerization catalyst suitable for gas phase polymerization of conjugated diene monomers, comprising the steps of:

(1) providing a bound rubber particle having a diameter of about one micron to about 1000 microns, the particle being prepared by the steps of (a) mixing together in a mixer having a variable speed rotor and a temperature control, (i) a polymer and (ii) an excess of carbon black, at a selected temperature and rotor speed for a time sufficient to pulverize the polymer and the carbon black, and to allow at least 25% of the polymer to be bound with carbon black, (b) removing the particles from the mixer, (c) sizing the particles;

(2) reacting (i) the bound rubber particle with (ii) an alkali metal compound having the formula R(Me), where R represents a hydrocarbyl group containing from one to about 20 carbon atoms, and Me is a Group IA alkali metal, in the presence of (iii) a polar coordinator, to form a reaction product having the formula $P(Me)_n$ wherein P represents a bound rubber particle having covalently bonded alkali metal atoms, and n is an integer equal to or greater than 3.

8. The method of claim 7, wherein the alkali metal is selected from the group consisting of lithium sodium and potassium.

9. The method of claim 8, wherein the alkali metal is lithium.

10. The method of claim 7, wherein the alkali metal compound represents a mixture of a lithium compound and at least one compound selected from the group of sodium compound, potassium compound, rubidium compound, cesium compound and francium compound.

11. The method of claim 7, wherein the R group is selected from aliphatic and cyclo-aliphatic groups consisting essentially of alkyls, cycloalkyls, alkenyls, alkynyls, aryls, aralkyls, and combinations thereof.

12. The method of claim 7, wherein the alkali metal compound is n-butyl lithium.

13. The method of claim 7, wherein the polar coordinator is selected from the group consisting essentially of tetrahydrofuran, linear oligomeric oxolanyl alkanes, cyclic oligomeric oxolanyl alkanes, dialkyl ethers of mono and oligo alkylene glycols, crown ethers, fully alkylated diamines, fully alkylated triamines, and mixtures thereof.

14. The method of claim 7, wherein the molar ratio of the polar coordinator to the alkali metal compound is about 0.03:1 to about 4:1.

15. The method of claim 14, wherein the molar ratio is about 0.05:1 to about 1:1.

16. The method of claim 15, wherein the molar ratio is about 0.06:1 to about 0.5:1.

* * * * *